(12) United States Patent
Trang

(10) Patent No.: US 8,139,357 B2
(45) Date of Patent: *Mar. 20, 2012

(54) LAPTOP ELEVATION DEVICE

(76) Inventor: Brian T. Trang, Naples, FL (US)

(*) Notice: Subject to any disclaimer, the term of this patent is extended or adjusted under 35 U.S.C. 154(b) by 37 days.

This patent is subject to a terminal disclaimer.

(21) Appl. No.: 12/754,226

(22) Filed: Apr. 5, 2010

(65) Prior Publication Data

US 2011/0069447 A1 Mar. 24, 2011

Related U.S. Application Data

(63) Continuation-in-part of application No. 12/564,097, filed on Sep. 22, 2009, now Pat. No. 8,050,032.

(51) Int. Cl.
G06F 1/16 (2006.01)
B41J 11/56 (2006.01)

(52) U.S. Cl. .................. 361/679.59; 400/681

(58) Field of Classification Search .......... 361/679.01–679.45, 679.55–679.59; 312/223.1, 223.2; 400/681
See application file for complete search history.

(56) References Cited

U.S. PATENT DOCUMENTS

| | | | |
|---|---|---|---|
| 5,141,196 A * | 8/1992 | Arnold et al. ................ | 248/397 |
| 5,375,800 A * | 12/1994 | Wilcox et al. ............... | 248/118.1 |
| 5,503,361 A | 4/1996 | Kan-o et al. | |
| 5,552,960 A | 9/1996 | Nelson et al. | |
| 5,633,782 A * | 5/1997 | Goodman et al. ....... | 361/679.41 |
| 5,818,690 A | 10/1998 | Spencer | |
| 5,831,823 A | 11/1998 | Hoedl | |
| 6,016,248 A * | 1/2000 | Anzai et al. ............... | 361/679.59 |
| 6,076,787 A * | 6/2000 | Troyer ......................... | 248/166 |
| 6,098,952 A * | 8/2000 | Tonn ............................ | 248/688 |
| 6,239,971 B1 | 5/2001 | Yu et al. | |
| 6,256,193 B1 | 7/2001 | Janik et al. | |
| 6,279,861 B1 | 8/2001 | Nolan | |
| 6,437,978 B1 | 8/2002 | Ozaki et al. | |

(Continued)

FOREIGN PATENT DOCUMENTS

DE 202005001418 6/2005

(Continued)

*Primary Examiner* — Jayprakash N Gandhi
*Assistant Examiner* — Nidhi Desai
(74) *Attorney, Agent, or Firm* — The Livingston Firm; Edward M. Livingston, Esq.; Bryan L. Loeffler, Esq.

(57) ABSTRACT

A laptop elevation device (1) that attaches to a bottom surface (13) of a laptop (12). Each laptop elevation device has a fold-up leg (2) pivotally or hingedly attached to a base (3). An arm (5) is pivotally attached to the base. When the laptop elevation device is in an open position, the arm may be folded downward to engage one of a plurality of holes (9) located on the leg, thereby locking the laptop elevation device at a desired height. The base may be built into a laptop or attached to the underside of an existing laptop using an attachment means (14). The leg may also have a layer of rubber (11) to prevent the leg from slipping while in use. A clip (11) located on the base locks the leg and arm in place while the laptop elevation device is in folded position. An additional feature of the laptop elevation device is one or more non-slip strips (20) that attach to the underside of a laptop to allow the front portion of the laptop to hang over the edge of a flat surface (22) while the laptop is in an elevated position. An alternative embodiment of the laptop elevation device provides a handle (17) for carrying the laptop computer.

6 Claims, 4 Drawing Sheets

U.S. PATENT DOCUMENTS

| | | | |
|---|---|---|---|
| 6,474,614 B2 | 11/2002 | MacEachern | |
| 6,498,719 B1 * | 12/2002 | Bridges | 361/679.34 |
| 6,527,241 B1 | 3/2003 | Lord | |
| 6,529,377 B1 | 3/2003 | Nelson et al. | |
| 6,568,650 B2 | 5/2003 | Helmetsie et al. | |
| 6,654,237 B1 * | 11/2003 | Lee | 361/679.55 |
| 6,682,040 B1 | 1/2004 | MacEachern | |
| 6,825,415 B1 | 11/2004 | Chen et al. | |
| D513,008 S * | 12/2005 | Takizawa et al. | D14/447 |
| 7,001,088 B2 | 2/2006 | Hui-hu | |
| 7,035,100 B2 | 4/2006 | Lord | |
| 7,161,799 B2 | 1/2007 | Lim et al. | |
| 7,173,819 B2 | 2/2007 | Wilkox | |
| 7,207,540 B2 | 4/2007 | Thomas | |
| 7,280,355 B2 | 10/2007 | Taylor | |
| 7,324,340 B2 | 1/2008 | Xiong | |
| 7,417,853 B1 | 8/2008 | Myers et al. | |
| 7,532,463 B2 | 5/2009 | Jacobs et al. | |
| 7,784,752 B2 * | 8/2010 | Tang | 248/188.8 |
| 2003/0231466 A1 | 12/2003 | Huang | |
| 2005/0213302 A1 | 9/2005 | Lin | |
| 2006/0192070 A1 * | 8/2006 | Chan | 248/371 |
| 2006/0243878 A1 | 11/2006 | Saad | |
| 2007/0258206 A1 | 11/2007 | Huang | |
| 2008/0174947 A1 * | 7/2008 | Chang | 361/683 |
| 2008/0192424 A1 | 8/2008 | Lee | |
| 2008/0251680 A1 | 10/2008 | Matias | |
| 2008/0265109 A1 * | 10/2008 | Derry et al. | 248/149 |
| 2009/0178938 A1 | 7/2009 | Palmer | |
| 2009/0179131 A1 | 7/2009 | Lord et al. | |
| 2009/0179132 A1 | 7/2009 | Qin et al. | |

FOREIGN PATENT DOCUMENTS

| | | |
|---|---|---|
| DE | 202005017227 | 3/2006 |
| WO | WO2005/054739 | 6/2005 |
| WO | WO2006/121229 | 11/2006 |

* cited by examiner

LAPTOP ELEVATION DEVICE

CROSS REFERENCE TO RELATED APPLICATION

This is a continuation-in-part application of Ser. No. 12/564,097 filed on Sep. 22, 2009, now U.S. Pat. No. 8,050,032. The patent application identified above is incorporated here by reference in its entirety to provide continuity of disclosure.

BACKGROUND OF THE INVENTION

This invention relates to laptop computers, more particularly, a device for elevating a rear portion of a laptop computer in order to allow for greater air flow under the laptop computer, thereby preventing the laptop computer from overheating.

Laptop computers dissipate heat through their bottom surfaces. Small rubber feet are typically located on the bottoms of laptops to provide an air gap for cooling beneath the laptop. However, the air gaps created by these rubber feet are often very narrow and do not provide enough air circulation under a laptop. Therefore, there is a tendency for laptops to heat up to the point where the heat may pose a risk of injury to the user, damage to the surface on which the laptop is resting and/or to the laptop itself. A further problem is that user's who type on laptops often experience discomfort because the laptops are in a flat position causing a user to keep his or her wrists and hands in an unnatural position.

Therefore, a need exists for a laptop elevation device that elevates a rear portion of a laptop computer to allow for greater air flow under the laptop computer and tilts the keyboard to provide a user with greater ergonomic positioning of his or her wrists and hands while typing.

The relevant prior art includes the following references:

| Pat. No. (U.S. unless stated otherwise) | Inventor | Issue/Publication Date |
|---|---|---|
| 2009/0178938 | Palmer | Jul. 16, 2009 |
| 2009/0179131 | Lord et al. | Jul. 16, 2009 |
| 2009/0179132 | Qin et al. | Jul. 16, 2009 |
| 7,532,463 | Jacobs et al. | May 12, 2009 |
| 2008/0251680 | Matias | Oct. 16, 2008 |
| 7,417,853 | Myers et al. | Aug. 26, 2008 |
| 2008/0192424 | Lee | Aug. 14, 2008 |
| 7,324,340 | Xiong | Jan. 29, 2008 |
| 2007/0258206 | Huang | Nov. 08, 2007 |
| 7,280,355 | Taylor | Oct. 09, 2007 |
| 7,207,540 | Thomas | Apr. 24, 2007 |
| 7,173,819 | Wilkox | Feb. 06, 2007 |
| 7,161,799 | Lim et al. | Jan. 09, 2007 |
| WO2006/121229 | Lee | Nov. 16, 2006 |
| 2006/0243878 | Saad | Nov. 02, 2006 |
| 7,035,100 | Lord | Apr. 25, 2006 |
| DE202005017227 | Engel | Mar. 09, 2006 |
| 7,001,088 | Hui-hu | Feb. 21, 2006 |
| 2005/0213302 | Lin | Sep. 29, 2005 |
| WO2005/054739 | Ramirez | Jun. 16, 2005 |
| DE202005001418 | Engel | Jun. 02, 2005 |
| 6,825,415 | Chen et al. | Nov. 30, 2004 |
| 6,682,040 | MacEachern | Jan. 27, 2004 |
| 2003/0231466 | Huang | Dec. 18, 2003 |
| 6,568,650 | Helmetsie et al. | May 27, 2003 |
| 6,527,241 | Lord | Mar. 04, 2003 |
| 6,529,377 | Nelson et al. | Mar. 04, 2003 |
| 6,474,614 | MacEachern | Nov. 05, 2002 |
| 6,437,978 | Ozaki et al. | Aug. 20, 2002 |
| 6,279,861 | Nolan | Aug. 28, 2001 |
| 6,256,193 | Janik et al. | Jul. 03, 2001 |
| 6,239,971 | Yu et al. | May 29, 2001 |
| 5,831,823 | Hoedl | Nov. 03, 1998 |
| 5,818,690 | Spencer | Oct. 06, 1998 |
| 5,552,960 | Nelson et al. | Sep. 03, 1996 |
| 5,503,361 | Kan-o et al. | Apr. 02, 1996 |

SUMMARY OF THE INVENTION

The primary object of the present invention is to provide a laptop elevation device that elevates the rear portion of a laptop computer.

Another object of the present invention is to provide a laptop elevation device that provides greater air flow to the bottom surface of a laptop.

An even further object of the present invention is to provide a laptop elevation device that provides greater comfort to a user while typing on a laptop.

Another object of the present invention is to provide a laptop elevation device that has a height adjustment means.

An even further object of the present invention is to provide a laptop elevation device that may also act as a handle for carrying a laptop.

Another object of the present invention is to provide a laptop elevation device that provides one or more non-slip strips that allow a user to place the underside of a laptop on the edge of a table or other flat surface while the laptop is in an elevated position.

The present invention fulfills the above and other objects by providing a pair of laptop elevation devices that attach to a bottom surface of a laptop computer. Each laptop elevation device has a fold-up leg pivotally or hingedly attached to a base. An arm is pivotally attached to the base. When the laptop elevation device is in an open position, the arm may be folded downward to engage one of a plurality of holes located on the leg, thereby locking the laptop elevation device at a desired height. The base may be built into a laptop or attached to the underside of an existing laptop using an attachment means, such as a hook and loop fastener, adhesive, double sided tape, interlocking strips, etc. The leg may also have a layer of rubber to prevent the leg from slipping while in use. When the laptop elevation device is not in use the leg and the arm may be folded flat against the underside of the laptop so the laptop can fit into a carrying case. A clip located on the base locks the leg and arm in place while the laptop elevation device is in folded position.

An additional feature of the laptop elevation device is one or more non-slip strips that attach to the underside of a laptop. The one or more non-slip strips allow a user to place the underside of a laptop against the edge of a table or other flat surface and have the front portion of the laptop hang over the edge of the table or other flat surface while the laptop is in an elevated position, thereby placing the laptop in an ergonomic position for typing.

An alternative embodiment of the laptop elevation device provides a handle for carrying the laptop computer.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which.

DESCRIPTION OF THE PREFERRED EMBODIMENTS

Figure 1:
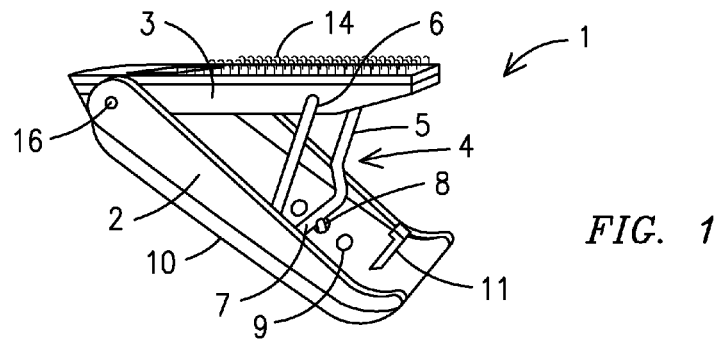
FIG. 1 is a perspective side view of a laptop elevation device of the present invention in an open position.

For purposes of describing the preferred embodiment, the terminology used in reference to the numbered accessories in the drawings is as follows:
1. laptop elevation device
2. leg
3. base
4. height adjustment means
5. arm
6. proximal end of arm
7. distal end of arm
8. pin
9. hole
10. rubber
11. clip
12. laptop
13. bottom surface
14. attachment means
15. slot
16. pivot point
17. handle
18. hollow portion
19. spring
20. non-slip strip
21. ridge
22. flat surface With reference to FIG. 1, a perspective side view of a laptop elevation device 1 of the present invention in an open position is shown. Each laptop elevation device 1 has a fold-up leg 2 attached to a base 3 at pivot points 16. A height adjustment means 4 allows a user to adjust the space between the base 3 and the leg 2, thereby adjusting the height the that a laptop 12 is elevated to, as shown in FIG. 3. As shown here, the height adjustment means is an arm 5 having a proximal end 6 and a distal end 7. The arm is pivotally attached to the base 3 at the proximal end 6. A pin 8 is located on the distal end of the arm 5. When the laptop elevation device 1 is an open position the arm 5 may be folded downward from the base 3 so that the pin 8 engages one of a plurality of holes 9 located on the leg 2, thereby locking the laptop elevation device 1 at a desired height. A layer of rubber 10 located on the leg 2 prevents it from slipping while in use. A clip 11 located on the leg 2 engages the base 3 when the laptop elevation device 1 is in a closed position, thereby locking the laptop elevation device in a closed position, as shown further in FIG. 2. The base may be an integral part of a laptop 12 or attached to the bottom surface 13 of an existing laptop 12 using an attachment means 14, such as a hook and loop fastener, adhesive, double sided tape, interlocking strips, etc.

Figure 2:
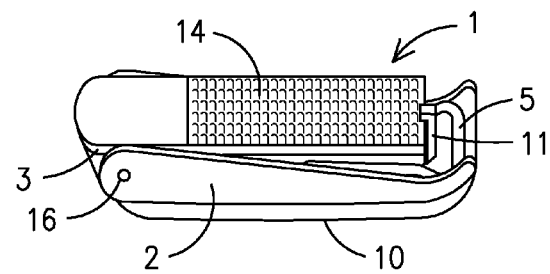
FIG. 2 is a perspective side view of a laptop elevation device of the present invention in a closed position.
Figure 3:
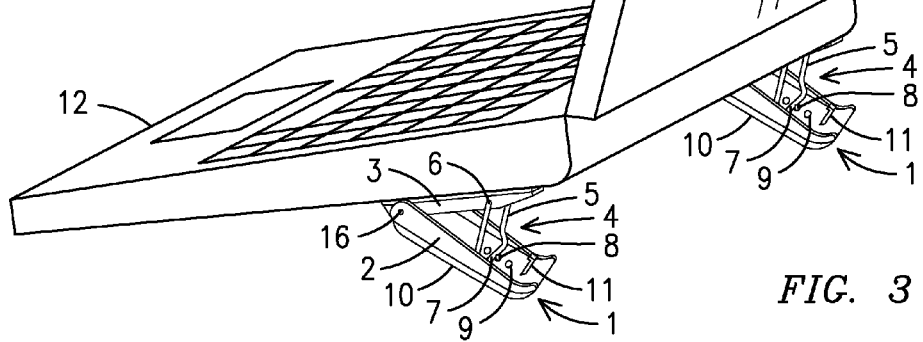
FIG. 3 is a perspective side view of a laptop having a pair of laptop elevation devices of the present invention attached thereto.

With reference to FIG. 2, a perspective side view of a laptop elevation device 1 of the present invention in a closed position is shown. Each laptop elevation device 1 has a fold-up leg 2 attached to a base 3 at pivot points 16. An arm 5, which acts as a height adjustment means 4, is pivotally attached to the base 3. When not in use the leg 2 and the arm 3 may be folded upward flat against the base 3. A clip 11 located on the leg 2 engages the base 3 when the laptop elevation device 1 is in a closed position, thereby locking the laptop elevation device in a closed position. A layer of rubber 10 located on the leg 2 prevents the leg 2 from slipping while in use.

Now referring to FIG. 3, a perspective side view of a laptop 12 having a pair of laptop elevation devices 1 of the present invention attached thereto is shown. Each laptop elevation device 1 has a fold-up leg 2 attached to a base 3 at pivot points 16. A height adjustment means 4 allows a user to adjust the space between the base 3 and the leg 2, thereby adjusting the height to while the laptop is elevated, as shown in FIG. 3. As shown here, the height adjustment means is an arm 5 having a proximal end 6 and a distal end 7. The arm is pivotally attached to the base 3 at the proximal end 6. A pin 8 is located on the distal end of the arm 5. When the laptop elevation device 1 is an open position the arm 5 may be folded downward from the base 3 so that the pin 8 engages one of a plurality of holes 9 located on the leg 2, thereby locking the laptop elevation device 1 at a desired height. A layer of rubber 10 located on the leg 2 prevents the leg 2 from slipping while in use. The base 3 may be an integral part of a laptop 12 or attached to the bottom surface 13 of an existing laptop 12 using an attachment means 14, such as a hook and loop fastener, adhesive, double sided tape, interlocking strips, etc.

Figure 4:
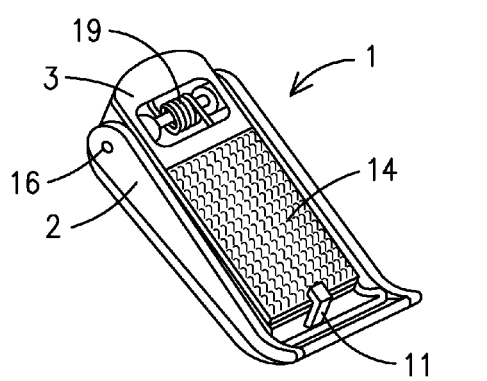
FIG. 4 is a perspective top view of a laptop elevation device of the present invention in a closed position.

Now referring to FIG. 4, a perspective top view of a laptop elevation device 1 of the present invention in a closed position is shown. Each laptop elevation device 1 has a fold-up leg 2 attached to a base 3 at pivot points 16. The base 3 may be an integral part of a laptop 12 or attached to the bottom surface 13 of an existing laptop 12 using an attachment means 14, such as a hook and loop fastener, adhesive, double sided tape, interlocking strips, etc. A clip 11 located on the leg 2 engages the base 3 when the laptop elevation device 1 is in a closed position, thereby locking the laptop elevation device in a closed position. A spring 19 located between the leg 2 and the base 3 biases the laptop elevation device 1 into a closed position, thereby holding the laptop elevation device 1 in place.

Figure 5:
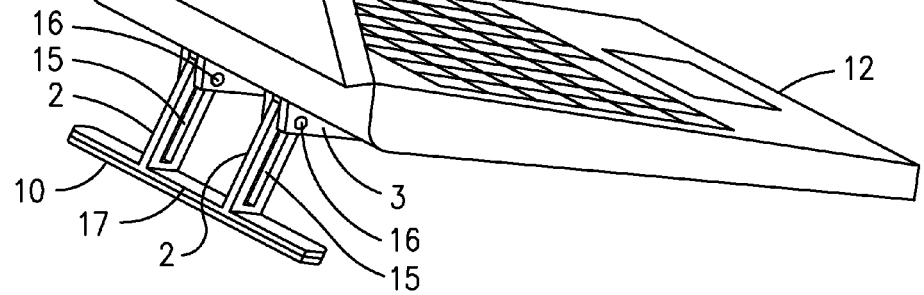
FIG. 5 is a perspective side view of an alternative embodiment of a laptop elevation device in a fully open position attached to a bottom surface of a laptop.

Now referring to FIG. 5, a perspective side view of an alternative embodiment of a laptop elevation device 1 in a fully open position attached to a bottom surface 13 of a laptop 12 is shown. The laptop elevation device 1 has fold-up legs 2 pivotally attached to corresponding bases 3. Slots 15 are located in the legs 2. The slots 15 allow the legs 2 to fold up and down and to slide along pivot points 16 located in the bases 3. A handle 17 connects the legs 2 and allows a user to carry the laptop 12. A layer of rubber 10 located on the leg 2 prevents the leg 2 from slipping while in use. The bases 3 may be an integral part of a laptop 12 or attached to the bottom surface 13 of an existing laptop 12 using an attachment means 14, such as a hook and loop fastener, adhesive, double sided tape, interlocking strips, etc.

Figure 6:
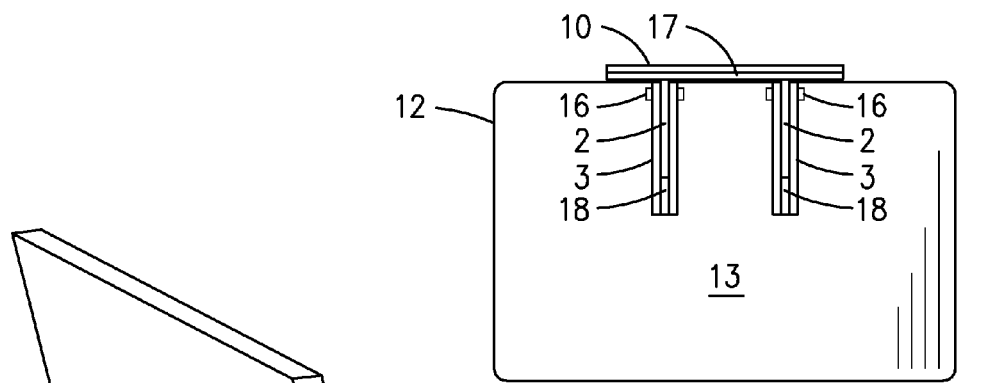
FIG. 6 is a bottom plan view of an alternative embodiment of a laptop elevation device in a closed position attached to a bottom surface of a laptop.

Now referring to FIG. 6, a bottom plan view of an alternative embodiment of a laptop elevation device 1 in a closed position attached to a bottom surface 13 of a laptop 12 is shown. The laptop elevation device 1 has fold-up legs 2 pivotally attached to corresponding bases 3. Slots 15 are located in the legs 2, as shown in FIG. 4. The slots 15 allow the legs 2 to fold up and down and to slide along pivot points 16 located in the bases 3. Hollow portions 18 of the bases 3 allow the legs 2 to be slid into the bases 3 when the laptop elevation device 1 is not in use. A handle 17 connects the legs 2 and allows a user to carry the laptop 12. A layer of rubber 10 located on the leg 2 prevents the leg 2 from slipping while in use. The bases 3 may be an integral part of a laptop 12 or attached to the bottom surface 13 of an existing laptop 12 using an attachment means 14, such as a hook and loop fastener, adhesive, double sided tape, interlocking strips, etc.

Figure 7:
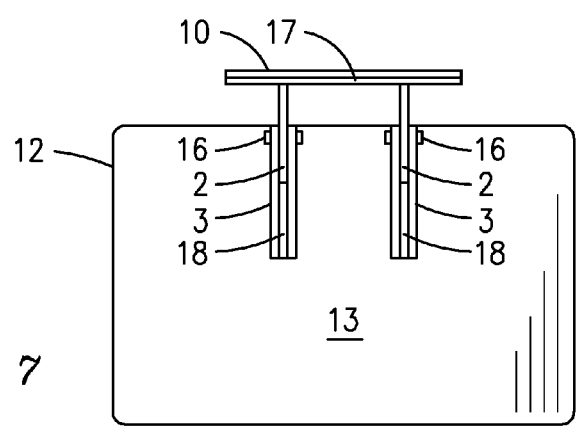
FIG. 7 is a bottom view of an alternative embodiment of a laptop elevation device in a partially open position attached to a bottom surface of a laptop.

With reference to FIG. 7, a bottom view of an alternative embodiment of a laptop elevation device 1 in a partially open position attached to a bottom surface 13 of a laptop 12 is shown. The laptop elevation device 1 has fold-up legs 2 pivotally attached to corresponding bases 3. Slots 15 are located in the legs 2, as shown in FIG. 4. The slots 15 allow the legs 2 to fold up and down and to slide along pivot points 16 located in the bases 3. A handle 17 connects the legs 2 and allows a user to carry the laptop 12 when the handle is slid out of the bases 3. A layer of rubber 10 located on the leg 2 prevents the leg 2 from slipping while in use. The bases 3 may be an integral part of a laptop 12 or attached to the bottom surface 13 of an existing laptop 12 using an attachment means 14, such as a hook and loop fastener, adhesive, double sided tape, interlocking strips, etc.

Figure 8:
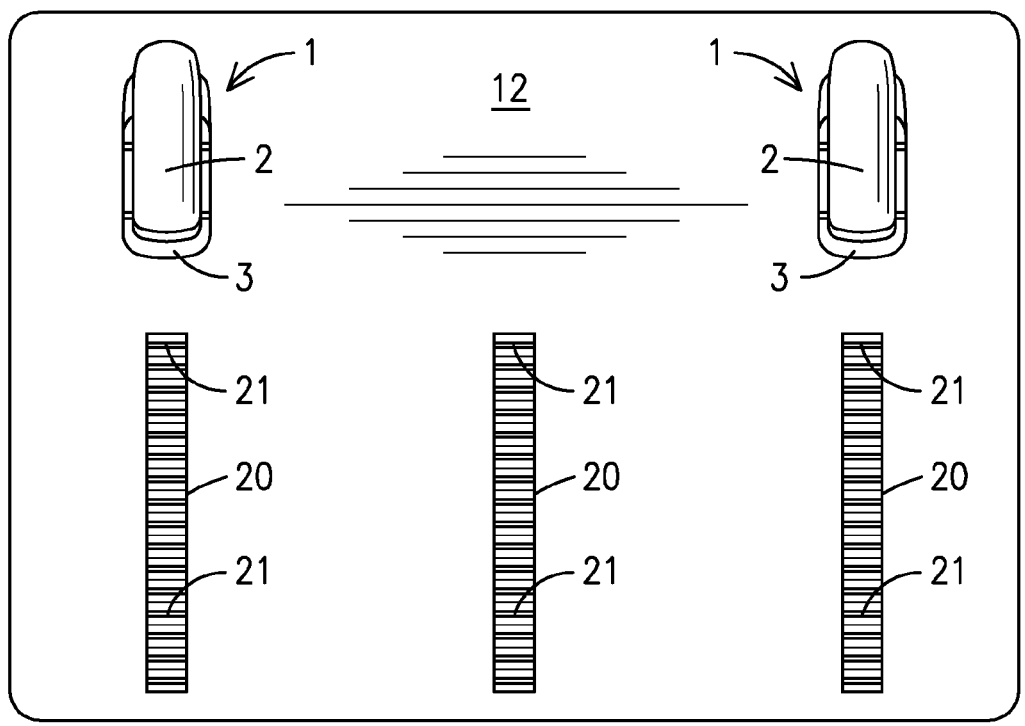
FIG. 8 is a bottom view of a laptop having a laptop elevation device with non-slip strips attached thereto.
Figure 9:
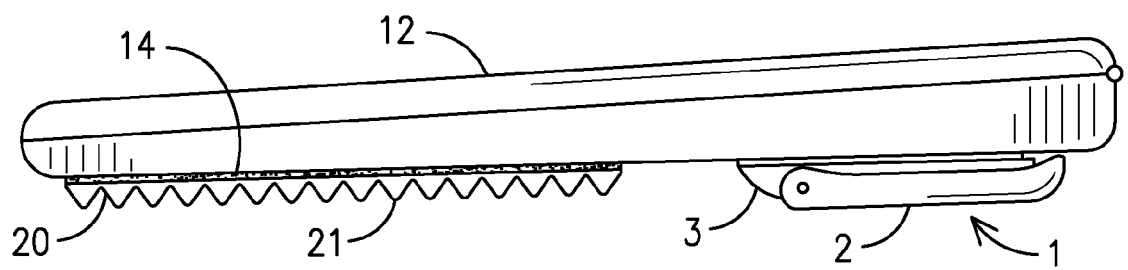
FIG. 9 is a side view of a laptop having a laptop elevation device with non-slip strips attached thereto.

With reference to FIGS. 8 and 9, a bottom view and a side view, respectively, of a laptop 12 having a laptop elevation device 1 with non-slip strips 20 attached thereto is shown. In addition to having legs 2 and corresponding bases 3 attached to the underside of the laptop 12, at least one non-slip strip 20 is also attached to the underside of the laptop 12. The one or more non-slip strips 20 are preferably made of a non-slip material, such as rubber, silicone, etc., that will prevent the laptop 12 from slipping when placed on a flat or angled surface 22. An attachment means 14, such as a hook and loop fastener, adhesive, double sided tape, interlocking strips, etc. is used to attached the one or more non-slip strips 20 to the laptop 12. The one or more non-slip strips 20 may also have ridges 21 that provide added traction when the laptop 12 is place on the edge of a flat surface 22 in an elevated position, as shown in FIG. 10.

Figure 10:
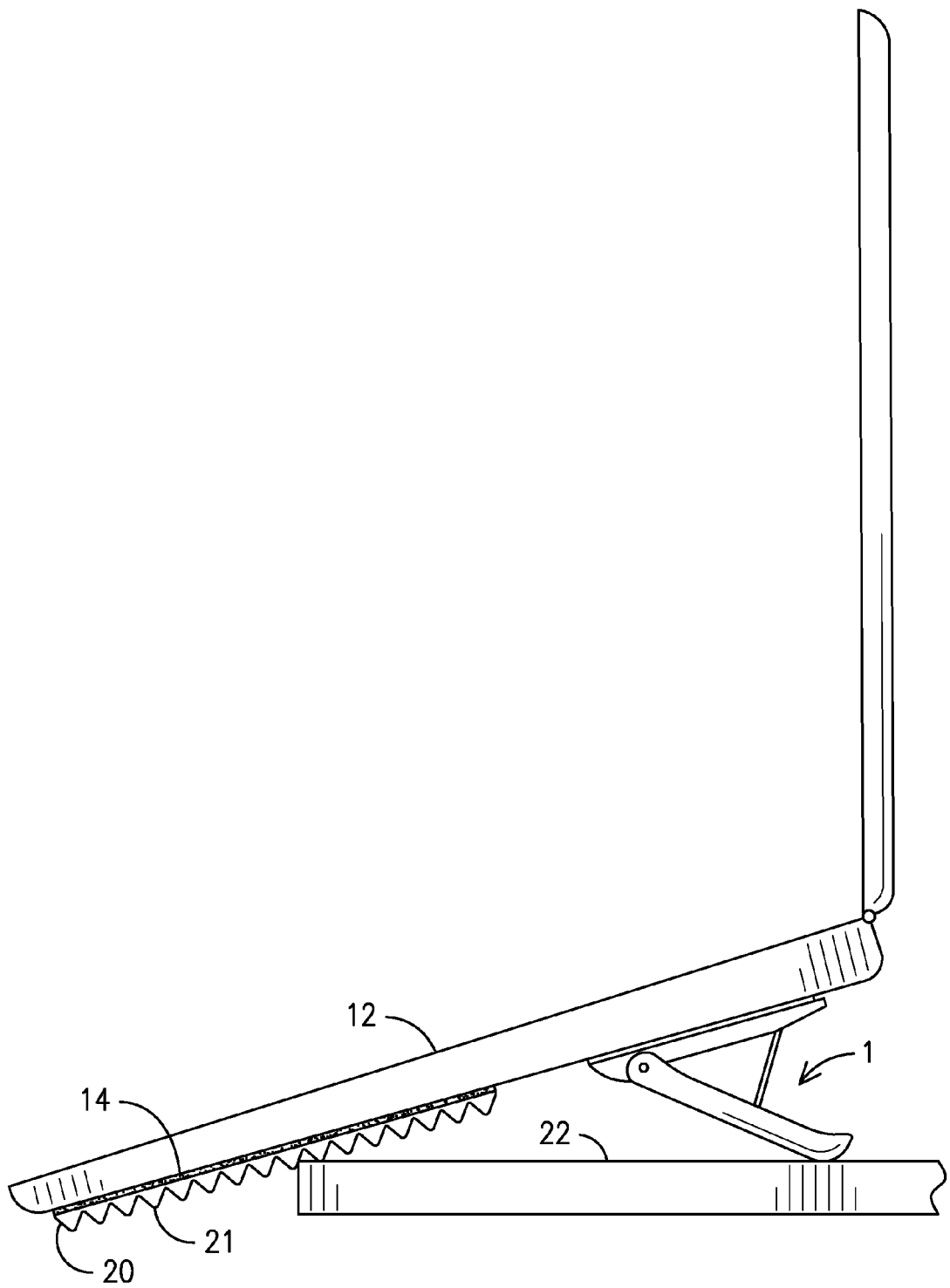
FIG. 10 is a side view of a laptop having a laptop elevation device with non-slip strips attached thereto sitting on a flat surface in an elevated position.

Finally with reference to FIG. 10, a side view of a laptop 12 having a laptop elevation device 1 with non-slip strips 20 attached thereto sitting on a flat surface 22 in an elevated position is shown. The non-slip strips 20 allow a user to place the underside of a laptop against the edge of a flat surface 22 and have the front portion of the laptop 12 hang over the edge of the flat surface while the laptop 12 is in an elevated position, thereby placing the laptop 12 in an ergonomic position for typing.

It is to be understood that while a preferred embodiment of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

The invention claimed is:

1. A laptop elevation device for laptop computers, said laptop elevation device comprising: a first base; a first leg having a proximal end pivotally attached to the first base; an attachment means located on the first base for attaching the laptop elevation device to a corner area of a bottom surface of a laptop computer; a second base; a second leg having a proximal end pivotally attached to the second base; an attachment means located on the second base for attaching the second base to a corner area of a bottom surface of the laptop computer opposite from the corner area where the first base is attached; at least two holes located on the first leg; a substantially U-shaped first arm located between the first leg and the first base for maintaining a predetermined distance between the first leg and the first base; said substantially U-shaped first arm having two proximal ends pivotally attached to the first base; said substantially U-shaped first arm having a distal end having a projection extending from the distal end and having a substantially similar shape as the at least two holes located on the first leg; at least two holes located on the second leg; a substantially U-shaped second arm located between the second leg and the second base for maintaining a predetermined distance between the second leg and the second base; said substantially U-shaped second arm having two proximal ends pivotally attached to the second base; said substantially U-shaped second arm having a distal end having a projection extending from the distal end and having a substantially similar shape as the at least two holes located on the second leg; said first base being separate from the second base, thereby allowing a user to attach the first base and the second base to opposite corner areas of a bottom surface of a laptop computer regardless of the dimensions of the laptop computer and while still leaving a substantial portion of the bottom surface of the laptop uncovered by the laptop elevation device; at least one non-slip strip; and an attachment means located on the at least one non-slip strip for attaching the at least one non-slip strip of the laptop elevation device to a bottom surface of a laptop computer; wherein: said projection located on the first substantially U-shaped arm is a pin that engages the at least two holes on the first leg; and said projection located on the second substantially U-shaped arm is a pin that engages the at least two holes on the second leg; wherein the laptop elevation device further comprising: a first spring located between the first base and the proximal end of the first leg; said first spring providing tension pushing the first leg into a closed position against the first base; a second spring located between the second base and the proximal end of the second leg; and said second spring providing tension pushing the second leg into a closed position against the second base.

2. The laptop elevation device of claim 1 further comprising:
   a clip located on the distal end of the first leg for locking the first leg in a closed position against the first base; and
   a clip located on the distal end of the second leg for locking the second leg in a closed position against the second base.

3. A laptop elevation device for laptop computers, said laptop elevation device comprising: a first base; a first leg having a proximal end pivotally attached to the first base; an attachment means located on the first base for attaching the laptop elevation device to a corner area of a bottom surface of a laptop computer; a second base; a second leg having a proximal end pivotally attached to the second base; an attachment means located on the second base for attaching the second base to a corner area of a bottom surface of the laptop computer opposite from the corner area where the first base is attached; at least two holes located on the first leg; a substantially U-shaped first arm located between the first leg and the first base for maintaining a predetermined distance between the first leg and the first base; said substantially U-shaped first arm having two proximal ends pivotally attached to the first base; said substantially U-shaped first arm having a distal end having a projection extending from the distal end and having a substantially similar shape as the at least two holes located on the first leg; at least two holes located on the second leg; a substantially U-shaped second arm located between the second leg and the second base for maintaining a predetermined distance between the second leg and the second base; said substantially U-shaped second arm having two proximal ends pivotally attached to the second base; said substantially U-shaped second arm having a distal end having a projection extending from the distal end and having a substantially similar shape as the at least two holes located on the second leg; said first base being separate from the second base, thereby allowing a user to attach the first base and the second base to opposite corner areas of a bottom surface of a laptop computer regardless of the dimensions of the laptop computer and while still leaving a substantial portion of the bottom surface of the laptop uncovered by the laptop elevation device; said projection located on the first substantially U-shaped arm is a pin that engages the at least two holes on the first leg; and said projection located on the second substantially U-shaped arm is a pin that engages the at least two holes on the second leg; at least one non-slip strip; and an attachment means located on the at least one non-slip strip for attaching the at least one non-slip strip of the laptop elevation device to a bottom surface of a laptop computer; wherein the laptop elevation device further comprising: a first spring located between the first base and the proximal end of the first leg; said first spring providing tension pushing the first leg into a closed position against the first base; a second spring located between the second base and the proximal end of the second leg; and said second spring providing tension pushing the second leg into a closed position against the second base.

4. The laptop elevation device of claim 3 further comprising:
   a clip located on the distal end of the first leg for locking the first leg in a closed position against the first base; and
   a clip located on the distal end of the second leg for locking the second leg in a closed position against the second base.

5. A laptop elevation device for laptop computers, said laptop elevation device comprising:
   a first base;
   a first leg having a proximal end pivotally attached to the first base;
   an attachment means located on the first base for attaching the laptop elevation device to a corner area of a bottom surface of a laptop computer;
   a second base;
   a second leg having a proximal end pivotally attached to the second base;
   an attachment means located on the second base for attaching the second base to a corner area of a bottom surface of the laptop computer opposite from the corner area where the first base is attached;
   at least two holes located on the first leg;
   a substantially U-shaped first arm located between the first leg and the first base for maintaining a predetermined distance between the first leg and the first base;
   said substantially U-shaped first arm having two proximal ends pivotally attached to the first base;
   said substantially U-shaped first arm having a distal end having a projection extending from the distal end and having a substantially similar shape as the at least two holes located on the first leg;
   at least two holes located on the second leg;
   a substantially U-shaped second arm located between the second leg and the second base for maintaining a predetermined distance between the second leg and the second base;
   said substantially U-shaped second arm having two proximal ends pivotally attached to the second base;
   said substantially U-shaped second arm having a distal end having a projection extending from the distal end and having a substantially similar shape as the at least two holes located on the second leg;
   said first base being separate from the second base, thereby allowing a user to attach the first base and the second base to opposite corner areas of a bottom surface of a laptop computer regardless of the dimensions of the laptop computer and while still leaving a substantial portion of the bottom surface of the laptop uncovered by the laptop elevation device;
   said projection located on the first substantially U-shaped arm is a pin that engages the at least two holes on the first leg;
   said projection located on the second substantially U-shaped arm is a pin that engages the at least two holes on the second leg;
   a first spring located between the first base and the proximal end of the first leg;
   said first spring providing tension pushing the first leg into a closed position against the first base;
   a second spring located between the second base and the proximal end of the second leg;
   said second spring providing tension pushing the second leg into a closed position against the second base;
   at least one non-slip strip; and
   an attachment means located on the at least one non-slip strip for attaching the at least one non-slip strip of the laptop elevation device to a bottom surface of a laptop computer.

6. The laptop elevation device of claim 5 further comprising:
   a clip located on the distal end of the first leg for locking the first leg in a closed position against the first base; and
   a clip located on the distal end of the second leg for locking the second leg in a closed position against the second base.

* * * * *